June 29, 1965 P. WESTERHOF 3,192,201
STEROID ENAMINES
Filed April 10, 1959 3 Sheets-Sheet 1
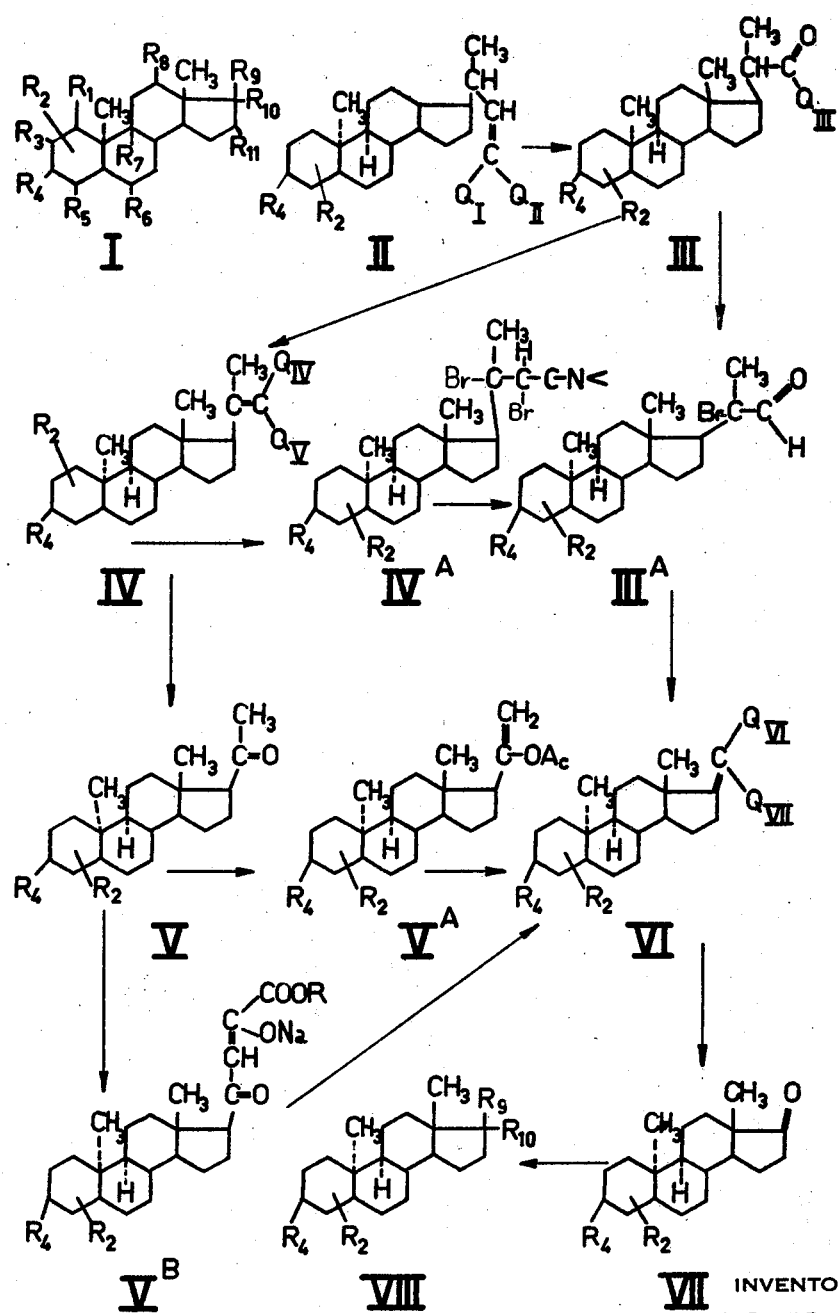
INVENTOR
PIETER WESTERHOF
BY
AGENT June 29, 1965 P. WESTERHOF 3,192,201
STEROID ENAMINES
Filed April 10, 1959 3 Sheets-Sheet 2
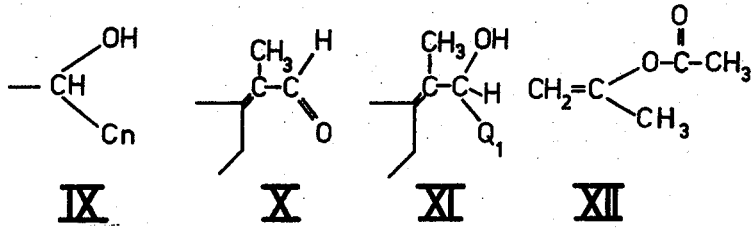
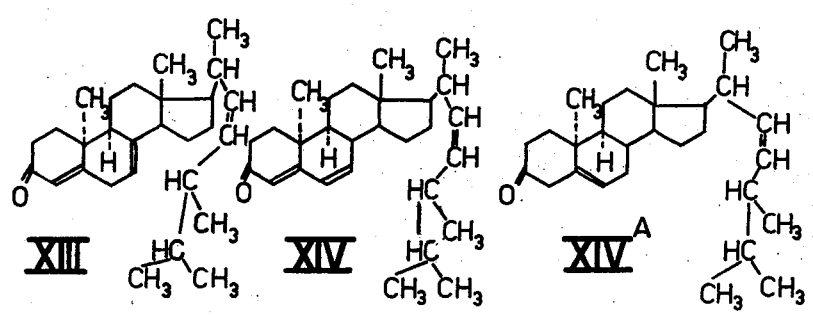
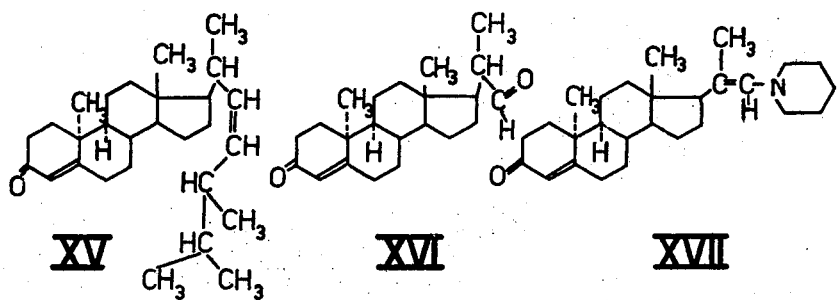
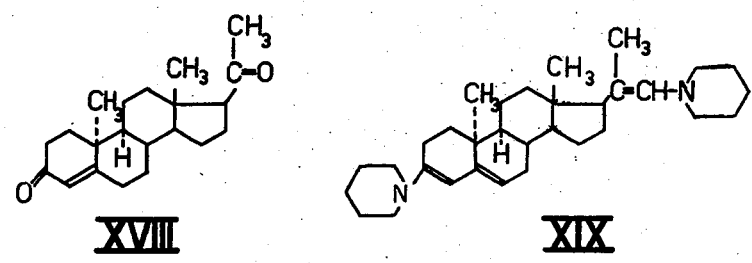
INVENTOR
PIETER WESTERHOF
BY
AGENT

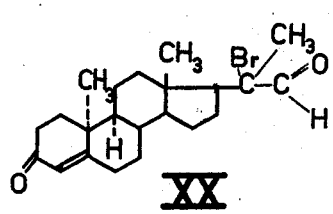 XX
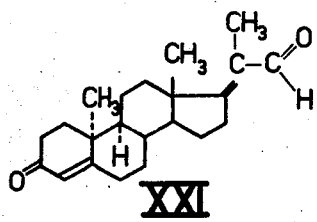 XXI
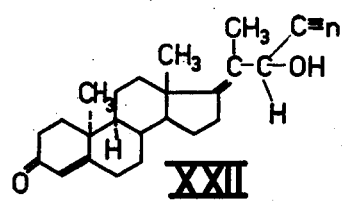 XXII
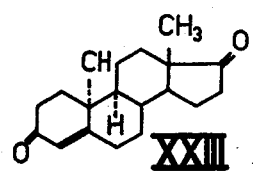 XXIII
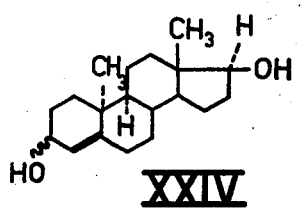 XXIV
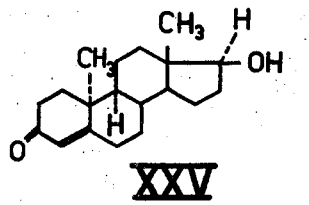 XXV – # United States Patent Office 3,192,201
Patented June 29, 1965

3,192,201
STEROID ENAMINES
Pieter Westerhof, Weesp, Netherlands, assignor to North American Philips Company Inc., New York, N.Y., a corporation of Delaware
Filed Apr. 10, 1959, Ser. No. 805,436
Claims priority, application Netherlands, Apr. 12, 1958, 226,774; Mar. 13, 1959, 237,103
1 Claim. (Cl. 260—239.5)

Steroids, which differ among one another with respect to the nature and the position of the substituents bound to the various carbon atoms of the cyclopentano-perhydrophenanthrene skeleton are known in large numbers. Many of these compounds have become known owing to their interesting pharmacological properties. Reference may be made to steroids with hormonal action, for example steroids of the oestron-, androstane- and pregnane-series. The hormones of the first-mentioned series have a steroid skeleton with an aromatized A- and/or B-ring, a hydroxy-group at the position 3 and a keto- or a hydroxy-group at the position 17. The 17-keto group may be converted into a 17-hydroxy-17-ethinylide. The hormones of this series usually act upon specifically feminine functions of mammals. The hormones of the androstane series have no aromatized rings in the steroid skeleton, have, however, a keto- or a hydroxy-group at the position 3, often a double bond between the carbon atoms 4 and 5 or 5 and 6, and, as a rule, a hydroxy- or a keto-group at the position 17. These compounds include furthermore a methyl-group at the positions 10 and 13 (the so-called 18- and 19-methyl-group). The hormones of this series strongly act upon the specifically masculine functions of mammals. The hormones of the pregnane series may contain at the position 17 of the steroid skeleton a group —CO—$CH_2OH$, —CHOH—$CH_2OH$, —CO—$CH_3$, or —CHOH—$CH_3$ and, moreover, sometimes a hydroxy-group, furthermore often a keto- or a hydroxy-group at the position 3 and/or 11, and, in some cases a double bond between the carbon atoms 3 and 5. To the carbon atoms 10 and 13 is always bound a methyl-group. Many of these compounds have the property of prolonging the lifetime of a test animal, when its adrenal glands have been removed.

Quite a strictly individual position is taken by progesterone, which compound has in the A-ring a 3-keto-$\Delta$-4-system and contains an acetyl-group at position 17. Also this compound has, at the carbon atoms 10 and 13, a methyl-group. Progesterone is a hormone which checks strongly the course of pregnancy.

In later years a large number of other, steroid-like compounds of diverging properties were synthesized. Reference may be made, inter alia to:

16-($\alpha$-amino-alkyl)-4-pregnene-3-20 diones and acyl-derivatives thereof, which compounds counteract the effect of progesterone (American patent specification 2,794,-815), 14-$\alpha$-hydroxy-11-desoxy-corticosterone and hydroxy-compounds acylated at position 21; these compounds are said to have, inter alia, anaesthetic, oestrogenous, testoidic, folliculoidic and luteoidic effects (American patent specification 2,727,911), 9-$\alpha$-fluoro-4-pregnene-11$\beta$,17-$\alpha$-21 - trihydroxy - 3, 20-diketotertiary butylacetate; compared with hydrocortisone acetate, this ester has a great, systemic and strongly local effect (American patent specification 2,736,681), $\Delta$1,4–3,20-diketo-11-keto- or 11-hydroxy - 17,21 - dihydroxy-pregnadiene-21-tertiary-butylacetate and 9-fluoro-derivatives thereof are said to have cortisone effect, but differ from the activity of cortisone by a reduced sodium and water retention (American patent specification 2,736,-734), 16$\alpha$-hydroxy-$\Delta$1,4-pregnadiene or the 9($\alpha$)-halide derivatives thereof; these compounds are said to be employable for combating burning phenomena of arthritis, asthma, bursitis and the like (American patent specification 2,789,118), $\Delta$4,8(9)-3,20-diketo-11,17-dihydroxy-21-keto or 21-hydroxy-pregnadienes are said to have properties affiliated to those of cortisone, but have reduced side-effect and, more particularly, a reduced sodium or water retention (American patent specification 2,808,415).

In all the aforesaid compounds a methyl-group is found at the positions 10 and 13 of the steroid skeleton, with the exception of the compounds affiliated to oestrone, which do not have a 10-methyl-group.

There have also been produced steroid-like compounds with interesting pharmacological effect, which, similar to oestrone, do not possess a methyl-group at the position 10 (so-called 19-nor-compounds). Of these compounds we may mention: 9-$\alpha$-halogen-11$\beta$,17-$\beta$-dihydroxy-17-$\alpha$-methyl-19-nor androstane 3-ones; these compounds are said to have strong anabolic and androgenic properties (American patent specification 2,806,863). A similar effect are said to have 19-nor-testosterones, acylated at the position 17 (American patent specification 2,798,-879).

Furthermore it is known that 19-nor-androstanolone has an activity which is a few times stronger than that of progesterone and that esters of 19-nor androstanolone with lower aliphatic carboxylic acids have reduced androgenic properties as compared with, for example, testosterone, but have retained an important part of the anabolic effect of the androgenic hormones (American patent specification 2,756,244). Although, as may be evident from the foregoing, many steroid-like compounds are known, which have a methyl-group at the position 10 or which do not possess a methyl-group at this position of the steroid skeleton, no attention has been paid to the influence of the $\alpha$- or $\beta$-configuration of the 10-methyl-group on the pharmacological properties of steroids. It should be noted in this respect that with all the aforesaid 10-methyl-compound the methyl-group and the hydrogen atom at carbon atom 9 are in $\beta$-configuration. A fairly large number of other steroid-like compounds are also known, of which the 10-methyl-group has $\alpha$-configuration, but a pharmacological activity of none of these compounds has been referred to.

It has now been found that steroids having a methyl-group in 10$\alpha$-configuration and a substituent (or a hydrogen atom) at carbon atom 9 likewise in $\alpha$-position are remarkable in their surprising pharmacological properties, which deviate from the corresponding 10$\beta$,9$\beta$-steroids.

In particular it has been found that this group of 10$\alpha$, 9$\alpha$-steroids contains compounds having oral, progestative, anabolic, anti-inflammatory or anti-hormonal (for example anti-estrogenic or anti-androgenic) activities.

Hitherto no useful or general method has been found to convert, for any compound of the 10$\beta$-methyl, 9$\beta$-steroid series, into a 10$\alpha$-methyl, 9$\alpha$-steroid. An entrance to the availability of a 10$\alpha$-methyl, 9$\alpha$-configuration can be found in the known conversion by heating at a temperature of 150° to 200° C. of vitamin $D_2$ or vitamin $D_3$. By this conversion said sterols are converted into respectively pyro-ergo- and pyro-chole-calciferol, which carry the methyl-group at position 10 in $\alpha$-configuration. According to recent investigations it is assumed that the hydrogen atom linked to the carbon atom 9 in these pyro-steroids is in $\alpha$-position (Castells, Proc. of the Chem. Soc. 1958, 7). The compounds according to this invention can be prepared by using said pyro-compounds as starting materials.

In accordance herewith the invention relates to pharmaceutic preparations, containing a steroid, of which the methyl-group at the position 10 and the hydrogen atom at the position 9 have the same position with respect to the steroid-skeleton as in pyro-calciferol.

In the formulae of the compounds according to this invention the 10-methyl-group of the steroid molecule is always indicated by a broken line, which means that this group occupies the α-position with respect to the plane of the steroid molecule. The hydrogen atom at the 9-position also is indicated by a broken line to the carbon atom concerned, which means that these compounds are derived from pyro-steroids, of which at this moment it is assumed that this hydrogen atom is in α-position. For completeness' sake it should be noted that all other substituents in the compounds according to the invention, as far as not indicated otherwise, can have α- and β-positions.

The invention relates more particularly to compounds of the general Formula I and intermediates in the preparation of them:

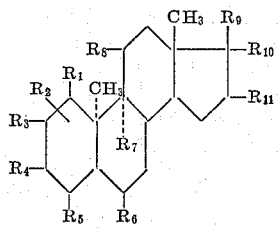

in which formula $R_1$ is a hydrogen atom or a methyl-group, $R_2$ may represent a double bond at one or more of the positions 1, 2, 3, 4, 5, 6, 7, 8, 9 (11), 15 and 16, $R_3$ is a hydrogen atom, a methyl- or ethyl-group, a halogen atom, or a hydroxy-group which may be etherified or esterified, $R_4$ is a keto-group or a hydroxy-group which may be etherified or esterified, $R_5$ is a halogen atom or a hydrogen atom, $R_6$ is a hydrogen atom, a methyl-group, a halogen atom, or a hydroxy-group which may be esterified or etherified, $R_7$ is a halogen atom or a hydrogen atom, $R_8$ is a hydrogen atom, a keto-group, or a hydroxy-group, $R_9$ is a hydrogen atom or a saturated or unsaturated hydrocarbon radical with 1 to 6 carbon atoms or such a hydrocarbon radical in which one or more of the hydrogen atoms is replaced by one or more hydroxy- or esterified or etherified hydroxy-groups and/or double bonded oxygen atoms or together with $R_{10}$ a keto-group, $R_{10}$ is a hydrogen atom or a hydroxy-group or an esterified or etherified hydroxy-group on the understanding that $R_9$ and $R_{10}$ are not both hydrogen atoms and also $R_9$ and $R_{10}$ together may represent one double-bonded oxygen atom, and $R_{11}$ is a hydrogen atom, a hydroxy-group or an etherified or esterified hydroxy-group, or a methyl-group.

Of these compounds particularly those are important in which $R_1$, $R_3$, $R_5$, $R_6$, $R_7$ and $R_{11}$ are hydrogen atoms, $R_2$ is a single bond, or a double bond at one or more of the positions 1, 3, 4, 5, 6 and 7, $R_4$ a keto- or a hydroxy-group or an etherified or esterified hydroxy-group, $R_8$ is a hydrogen atom or a keto- or hydroxy-group, $R_9$ a methyl-, ethinyl-, ethylidene-, ethyl-, acetyl-, hydroxylized acetyl- or a hydroxylized acetyl-group in which the hydroxy-group is esterified or etherified, and $R_{10}$ is an esterified or etherified or a non-esterified or non-etherified hydroxy-group, or a hydrogen atom, or in which formula $R_9$ and $R_{10}$ represent together one double bonded oxygen atom.

The compounds according to the invention may be produced by methods known per se for the production of analogous compounds on the understanding that the starting materials are pyro-ergo- and pyro-chole-calciferol.

As a matter of fact, other possibilities are left for the production of compounds according to the invention. For example the pyro-structure may be introduced in the presence of other than the said side chains by heating of the corresponding derivative with a vitamine D structure. It is possible, for example, to start from compounds in which the side chain represents that of sapogenines, for example diosgenine.

One method of producing the compounds according to the invention is diagrammatically shown in the annexed formulae. The starting substance is a compound of the general Formula II.

In this formula $R_4$ is a keto- or a hydroxy-group and $R_2$ may be a double bond between the carbon atoms 4 and 5. $Q^I$ and $Q^{II}$ are lower aliphatic hydrocarbon radicals with 1 to 6 carbon atoms, whereas one of these groups may also represent a hydrogen atom. A very suitable starting substance is that in which $Q^{II}$ is a H-atom, $Q^I$ a 3-methyl-butanol-2-group, $R_4$ a keto-group and $R_2$ a double bond between the carbon atoms 4 and 5, whereas the nucleus has the same structure as pyro-ergo-calciferol. By oxidative decomposition these starting compounds are converted into compounds of the general Formula III. $Q^{III}$ is a H-atom or an OH-group. The compounds according to Formula III are then converted into compounds of Formula IV. To this group of substances belong, inter alia, the enamines and the enol-acylates. In accordance herewith $Q^V$ indicates a hydrogen atom and $Q^{IV}$ a radical of a secondary amine or an O-acyl radical. However, this group of compounds may furthermore comprise substances in which $Q^{IV}$ is a hydrogen atom and $Q^V$ is a lower aliphatic hydrocarbon radical or a phenyl radical or in which $Q^{IV}$ and $Q^V$ are both a lower aliphatic hydrocarbon radical or both a phenyl radical.

By oxidation of compounds of the Formula IV, compounds according to the invention of the Formula V are obtained. These compounds, if they have a 3-keto Δ-4-system, are termed in the present application pyroprogesterone. The term pyro indicates the affiliation in the structure to the nucleus of the steroid skeleton of pyro-ergo-calciferol.

The compounds of the Formulae III, IV and V are suitable starting substances for the production of other important intermediate products in the production of compounds according to the invention. From the said groups of compounds compounds of the Formula VI may be produced. In these compounds $Q^{VI}$ is a hydrogen atom or a methyl-group and $Q^{VII}$ an aldehyd-group (or an addition compound thereof) or an O-acyl- or a COOR-group, wherein R is a lower aliphatic hydrocarbon radical with 1 to 6 carbon atoms. By the oxidation of compounds of the Formula VI the compounds of the Formula VII are produced, from which, if desired, by reduction of the 17-keto group or by the addition of a metal-organic compound, if desired by subsequent reduction, compounds according to the invention (Formula VIII) are obtained, in which at the position 17 of the steroid skeleton groups $R_9$ and $R_{10}$ are available, of which $R_9$ is a hydroxy- or an esterified hydroxy-group and $R_{10}$ is a hydrogen atom or $R_9$ is a saturated or an unsaturated lower aliphatic hydrocarbon radical with 1 to 3 carbon atoms and $R_{10}$ is a hydroxy- or an esterified hydroxy-group.

For details of the production referred to above for compounds of the Formula VIII from the compounds VII, VI, V, IV, III and II reference is made to the description hereinafter.

A different method of producing the compounds according to the invention could be formed, inter alia, by the oxidative decomposition of the saturated side chain of 10 α-methyl steroids, for example that of pyro-cholecalciferol or completely saturated pyro-ergocalciferol, for example with chromic acid, in which the corresponding 17-keto-, 17-acetyl-compounds and the corresponding ethio-, nor- and bis-nor-cholene- and cholene-acids may be produced, which compounds form part of the compounds according to the invention or may be converted into them.

The first part of the invention relates to a method of producing new steroids and is characterized in that a compound of the Formula II is subjected to oxidative decomposition to obtain compounds of the Formula III. In these formulas $Q^I$ and $Q^{II}$ are lower aliphatic hydrocarbon radicals or one of the groups $Q^I$ or $Q^{II}$ is a hydrogen atom. This method is particularly important for the conversion of compounds of the Formula II, in which $Q^I$ is a 3-methyl-butane-yl-2-group and $Q^{II}$ is a hydrogen atom, and $R_4$ and $R_2$ have the aforesaid meaning, on the understanding that, if $R_4$ is an etherified or an esterified hydroxy-group and $R_2$ were a double bond between the carbon atoms 3 and 5, this double bond is preferably protected from oxidation, for example by conversion into a dibromide. Both the bromine atoms can be readily split off, after the oxidative decomposition, by reducing the compound with zinc dust in glacial acetic acid. However, this protection is not required with starting products in which in the A-ring a 3-keto Δ4-system is available.

The double bond may, as an alternative, be protected by conversion into an epoxide, for example, by reaction with hydrogen peroxide in alkaline medium. The epoxide can be decomposed with KI in a weakly acidic medium, for example acetic acid, the double bond being re-established.

For the oxidative decomposition of a compound of Formula II choice may be made from a fairly large number of oxidizing agents. Use may be made, for example, of chromic trioxide, potassium-, sodium- or ammonium - bichromate, furthermore potassium permanganate and, particularly, ozone. The reaction may take place in a homogeneous, in a heterogeneous or in an aqueous medium. The compound to be oxidized may be available both in a dissolved and in a suspended state.

As solvents use may be made, for example, of oxidation-resistant aliphatic or aromatic, liquid hydrocarbons or mixtures thereof, for example, the higher aliphatic hydrocarbons, such as petroleum ether, ligroin, petrol, or aromatic hydrocarbons, for example, benzene, toluene, mesitylene. Very suitable have proved to be, moreover, a number of halogenated lower aliphatic hydrocarbons, for example, diethylene chloride, ethylene dichloride, chloroform, carbon tetrachloride, mono-chloro-benzene. If the compound to be oxidized is subjected to the reaction in a suspended state, use is preferably made of a polar solvent, for example water, as a medium.

The oxidation with chromic trioxide may take place in an alkaline, a neutral or an acidic medium. The alkalinity of the reaction medium may be obtained, for example by adding to the mixture of the reaction components an organic tertiary nitrogen base, for example, pyridine, collidine, piperidine, quinoline and so on. If the reaction is carried out in an acidic medium, it takes place preferably in acetic acid or a different, liquid, lower aliphatic carboxylic acid with 1 to 10 carbon atoms, for example, propionic acid, butyric acid, valeric acid, hexanic acid, heptanic acid, nonanic acid, isobutyric acid and so on. As an alternative, the reaction may be carried out in the presence of a strong inorganic acid, preferably sulfuric acid.

If the oxidative decomposition takes place with potassium- or sodium- or ammonium bichromate, it is desirable that the reaction medium should be acidic, which may be ensured by adding a strong inorganic acid, preferably sulfuric acid.

The oxidation with potassium permanganate may also take place in an alkaline, a neutral or an acidic medium; the reaction conditions may in this case be the same as stated above for the oxidation with chromium trioxide.

With the oxidation with chromium trioxide, potassium- or sodium-bichromate or potassium permanganate are usually produced the corresponding acids of the compounds according to Formula III, wherein $Q^{III}$, is a hydroxy group.

However, the oxidative decomposition of a compound of the Formula II is preferably carried out with ozone. This is conveniently carried out by dissolving the compound to be oxidized in one of the aforesaid solvents, and by introducing ozone into the liquid. It is advisable to keep the temperature low during the reaction, for example between $-100°$ C. and $+30°$ C., preferably between $-80°$ C. and $+10°$ C. The concentration of the compound to be oxidized is not subjected to narrow limits. It may lie, for example, between 0.5% by weight and the saturation concentration. The selectivity of the reaction may be further increased, in the presence of the 3-keto $Δ^4$ system in the starting steroid, by adding an organic nitrogen base to the reaction mixture; particularly pyridine yields good results in this case.

By the ozonization an ozonide is produced, which, subsequent to splitting up, yields an acid or an aldehyde of the Formula III. This splitting up may be carried out with reducing or oxidizing agents. As a reducing agent may be used, for example, zinc dust-glacial acetic acid, or iron powder in sulfuric acid. Further aliphatic aldehydes, for example formaldehyde, para-formaldehyde, acetaldehyde, butanal, propional, or aromatic aldehydes, for example benzaldehyde, and furthermore saccharoidal aldehydes for example glucose or pentose. Preferably the decomposition of the ozonide is carried out with mild reduction means, if $R_4$ and $R_2$ represent a 3-keto-$Δ^{4,6}$, or a 3-keto-$Δ^{4,7}$ system. In these cases use may be made of the mentioned aldehydes. If the splitting-up takes place by reduction, aldehydes are, as a rule, produced. With this reaction it is advantageous to use an inert atmosphere, preferably a nitrogen atmosphere, in order to prevent the aldehyde formed from being oxidized. As an oxidizing agent for the splitting-up of the ozonide use may be made of hydrogen peroxide, or an alkaline solution of potassium permanganate.

This part of the invention is particularly important for the production of the aldehydes according to formulae X and XIV, which compounds belong to the lumisterol- and pyro-ergo-calciferol series respectively. The compounds are valuable intermediate products for the production of the compounds according to the invention.

A particularly suitable starting substance is $Δ^{4,22}$ pyrostadiene 3-on, Formula XV. This compound is obtained by Oppenauer oxidation of pyrocalciferol, followed by isomerisation of the oxidation product (Formula XIII) in an acidic medium in propanol-2 into $Δ^{4,6,22}$-pyrostatriene 3-on (Formula XIV) and subsequent reduction of the $Δ^6$ double bond, for example with Li in $NH_3$.

In the Examples 1a, 1b and 1c this part of the invention is illustrated.

Very important intermediate products for the production of the compounds of Formula I are compounds of the general Formula IV. In this formula $Q^V$ is a hydrogen atom and $Q^{IV}$ either a secondary amine, which is bound with the nitrogen atom to the same carbon atom to which also $Q^V$ is bound, or an O-acyl-group, or a phenyl- or an alkyl-group. Moreover $Q^V$ may be a phenyl- or an alkyl-group.

In general, the compounds according to Formula IV may be produced from the compounds of Formula III, wherein $Q^{III}$ has the aforesaid meaning, i.e. is a hydrogen atom or a hydroxy-group. For the production of compounds according to Formula IV $Q^{III}$ may also be an O-alkyl-group or a halogen atom. These compounds are obtained by esterifying an acid of the Formula III or by halogenating it with a halogenating agent, which is capable of replacing a hydroxy-group in an acid by a halogen atom.

The production of the compounds according to Formula IV from the compounds of Formula III may be carried out in various ways in accordance with the meaning of $Q^{III}$, $Q^{IV}$ and $Q^{V}$. Various of these methods, which are known per se from literature, are briefly indicated hereinafter.

The methods are divided into two groups, with the first group, which will be designated by A herein, $Q^{III}$ is a hydrogen atom and $Q^{IV}$ also hydrogen atom. With a second method, which will be designated by B, $Q^{III}$ is an O-alkyl-group or a hydroxy-group and $Q^{V}$ is a phenyl- or an alkyl-group.

(A) $Q^{III}$ AND $Q^{V}$ ARE HYDROGEN ATOMS

To this group belong three methods for the cases in which $Q^{IV}$ is a secondary amine, an O-acyl-group, a phenyl- or an alkyl-group respectively.

(a) $Q^{IV}$ IS A SECONDARY AMINE

The reaction is carried out by reacting an aldehyde of the Formula III with a secondary amine, the conditions being such that water is separated out. As secondary amines use may be made, for example, of lower di-aliphatic amines with 1 to 6 carbon atoms or derivatives thereof, for example, diethyl amine, di-isopropylamine, dibutylamine, dibenzylamine, a hydroxylated di-aliphatic amine, for example diethanol amine, dimethanol amine, dipropanolamine, dibutanolamine, dipentanolamine. Very inviting amines are cyclic amines, for example piperidine.

It is essential that during the reaction of the aldehyde with the secondary amine water should be separated out. In order to achieve this effect, a catalyst may be added to the reaction mixture, so that the separation of water is accelerated. A compound suitable to this end is, for example, the para-toluene sulfonic acid.

By subjecting the mixture during the reaction to azeotropic distillation, it is prevented that the water already formed should counteract the conversion into the desired final product. To this end a suitable solvent may be added to the reaction mixture, for example, benzene or toluene. The water layer can be separated from the distillate and the solvent layer may be re-introduced or not re-introduced into the reaction mixture. A very suitable method consists in that the distillate is dried by water-extracting substances, whilst the dried solvent is then re-introduced into the reaction mixture. As drying agents use may be made for example of inorganic oxides, for example, calcium oxide, barium oxide or alumina.

The reaction between aldehyde and secondary amine may take place in the presence of a solvent. To this end use may be made, for example, of aliphatic or aromatic solvents, such as petroleum ether, ligroin, hexane, cyclohexane, benzene, toluene, xylene; moreover, aliphatic ethers, such as diethyl ether, di-isopropyl ether, dibutyl ether, di-isobutyl ether, tetrahydrofurane and so on. Moreover, an excess quantity of the secondary base may serve as a solvent.

The temperature of the reaction is preferably chosen between for example 25 and 100° C. Very satisfactory results are obtained at a reaction temperature between 40 and 110° C. It should be noted that certain secondary amines could engage in side-reactions, if at the position 3 of the steroid skeleton a keto-group in the presence or not in the presence of a $\Delta^4$-double bond is present in the molecule. In such a case it is advisable to react equimolar quantities of the secondary base and the aldehyde and not to use an excess quantity of the base as a solvent. Also if an equimolar quantity of the enamination agent is used and the reaction is carried out with a compound with a 3-keto $\Delta^4$-system, the di-enamine may be formed as a by-product.

(b) $Q^{IV}$ IS AN O-ACYL-GROUP

For the production of these compounds an aldehyde of the Formula III reacts with an acid anhydride in the presence of an alkali-salt of the acid or of the acid chloride or of an organic tertiary N-base, for example, pyridine. As an anhydride use may be made of that of a lower aliphatic carboxylic acid with 1 to 6 carbon atoms, for example, acetic acid, propionic acid, butyric acid or valeric acid. As an alkali-salt of the acid may be used, for example the sodium or the potassium salt. Also this reaction is to be carried out in the presence of a water binder or under such conditions that the water formed is conducted away from the reaction medium during the reaction. In the aforesaid cases the acid anhydride or the acid chloride act as water binders. For this reason it is advisable to carry out the reaction of the aldehyde with an excess quantity of the acid anhydride or the acid chloride. Moreover, inert solvents may be present, for example, aliphatic or aromatic hydrocarbons, but this is not required. The temperature of the reaction is preferably between 100 and 150° C., preferably between 40 and 110° C. It should be noted that, if at the position 3 of the steroid skeleton a keto-group is present, those complications will not occur which may occur in the reaction referred to under (a).

(c) $Q^{IV}$ IS A PHENYL- OR AN ALKYL-GROUP

This reaction is carried out by reacting an aldehyde of the Formula III with a phenyl- or an alkyl-Grignard compound, for example, phenyl-magnesium bromide or the Grignard compound of a lower aliphatic bromide with 1 to 6 carbon atoms, for example, of methyl-bromide, ethyl-bromide, propyl-bromide, isopropyl-bromide, butyl-bromide, isobutyl-bromide and so on. The reaction should be carried out under the normal conditions for the Grignard reaction, i.e. under anhydrous conditions and preferably in the presence of an aliphatic ether as a solvent. With this reaction an intermediate compound is OMgBr, which is converted into the corresponding hydroxy-compound by decomposition in neutral or weakly acidic medium, preferably an aqueous medium, to which 2 N hydrochloric acid or 2 N sulfuric acid may be added. This hydroxy compound is converted by dehydration, for example by heating in vacuo, in the presence or not in the presence of a dehydrating agent, into a compound of the Formula IV.

(B) $Q^{III}$ IS O-ALKYL OR HALOGEN, $Q^{IV}$ and $Q^{V}$ ARE PHENYL- OR ALKYL-GROUPS

(a) $Q^{III}$ IS O-ALKYL

This reaction is carried out by reacting an ester of the Formula III with a phenyl- or alkyl-Grignard compound. The ester consists in this case of an aliphatic ester, whilst the alkyl-group represents a lower aliphatic hydrocarbon radical with 1 to 6 carbon atoms, for example, a methyl-, ethyl-, propyl-, isopropyl-, butyl-, isobutyl-, or pentyl-group. As a Grignard compound use may be made, for example, of phenyl-magnesium bromide or methyl-, ethyl-, propyl-, isopropyl-, or butyl-magnesium bromide. The reaction may take place under the conditions known for the Grignard reactions. With the coupling reaction an intermediate compound is an OMgBr, which is to be subjected to dehydration after decomposition with water or diluted hydrous acids, for example diluted sulfuric acid or diluted hydrochloric acid, a hydroxy-compound being thus formed. This may be carried out by distilling to dryness the hydroxy compound, if desired, in the presence of a dehydrating agent, for example by refluxing the compound with acetic acid anhydride and pyridine or by heating the substance with iodine in acetic acid anhydride or with acetic acid without more or with thionylchloride, dissolved in toluene.

(b) $Q^{III}$ IS HALOGEN, FOR EXAMPLE, CHLORINE

This reaction is carried out by reacting an acid halide, for example the acid chloride or acid bromide of the Formula III with diphenyl-cadmium or with a zinc Grignard compound, for example, $C_6H_5ZnCl$.

The ketone produced in this reaction is then subjected to a Grignard reaction with phenyl- or alkyl-magnesium bromide, so that, after the decomposition of the reaction product in a neutral or acidic medium, a hydroxy compound is produced, which yields, by dehydration under the aforesaid conditions (heating in vacuo, heating with acetic acid, heating with iodine in acetic acid anhydride), a compound of the Formula IV. It should be noted that, in accordance with the last-mentioned reaction, compounds may be obtained in which $Q^{IV}$ and $Q^V$ need not be identical and, for example, $Q^{IV}$ is a phenyl group and $Q^V$ is an aliphatic hydrocarbon radical with 1 to 6 carbon atoms.

It may furthermore be observed that, if in the reactions described under A or B, $Q^{III}$, $Q^{IV}$ and/or $Q^V$ is an alkyl group or contains such a group or are such a group, they represent preferably an aliphatic hydrocarbon radical with 1 to 6 carbon atoms, particularly with 2 to 4 carbon atoms, for example an ethyl-, isopropyl-, or propyl-group.

The reactions described above are particularly important for the production of compounds of the Formula IV, wherein $Q^V$ is a hydrogen atom and $Q^{IV}$ is an O-acyl-group or a radical of a secondary amine. Particularly the O-acetyl-compound and the piperidino-compound are very inviting final products of the present reaction.

As a starting substance preferably use is made of the compound of the Formula III in which formula $Q^{III}$ is a hydrogen atom. Starting with this compound, inter-alia the important compounds of the Formula IV can be produced.

The compounds produced in accordance with this part of the invention are particularly important for the production of compounds of the Formula V or also of the Formula VI. Finally, it should be noted that isomers of the compounds of Formula IV owing to asymmetry of the molecule about the $\Delta^{20(22)}$-double bond are possible.

This part of the invention is illustrated in the Examples 2a and 2b, by the preparation of the compounds of the Formulas XVII and XIX.

The compounds of the general Formula IV, obtained by the methods described above, are very suitable for the production of compounds in which, at the position 17, there is an acetyl-group and a hydrogen atom. All these compounds are novel and have not yet been described in the literature. The compounds excel by their particular physiological action. Namely the hormonal action of the compounds of this group is remarkable.

The invention relates furthermore not only to this novel group of compounds, but also to the method of producing these substances.

In accordance with this part of the invention novel steroids are produced by oxidizing compounds of the general formula:

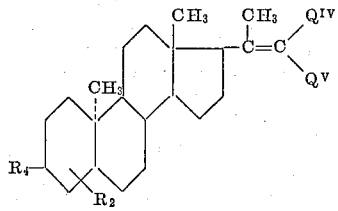

wherein $R_4$, $R_2$, $Q^{IV}$ and $Q^V$ have the aforesaid meanings, to obtain compounds of the general formula:

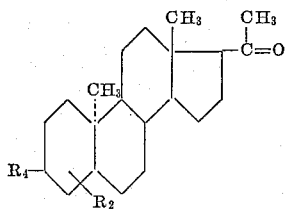

The production is carried out by oxidizing compounds of the Formula IV under mild conditions, so that no complete decomposition of the side chain at the carbon atom 17 takes place. Oxidizing agents suitable to this end are, for example, ozone, chromium trioxide, sodium- or potassium- or ammonium bichromate, potassium permanganate. As a rule, the oxidation takes place with ozone in a neutral medium, but the oxidation with the other aforesaid agents may take place both in an acidic and in an alkaline medium. The temperature of the reaction is preferably fairly low, i.e. between $-100°$ C. and $+100°$ C.

For the oxidation with ozone usually a slightly lower reaction temperature than for the oxidation with the other aforesaid means is applied. When using ozone the usual reaction temperature lies between $-100°$ and $+30°$ C., preferably between $-80°$ and $+10°$ C. For the other oxidizing agents the reaction temperature may be slightly higher, for example between $-20°$ and $+100°$ C., but preferably between $-10°$ and $+30°$ C. It is furthermore advisable to prevent hydrolysis of the enamine to add the compound to be oxidized slowly, in parts, to the oxidation agent, and to carry out the oxidation with the aid of non-oxidizable diluents. As diluents use may particularly be made of preferably oxidation-resistant aliphatic or aromatic hydrocarbons, for example, petroleum ether, ligroin, petrol, benzene, toluene, mesitylene. Very suitable have furthermore proved to be halogenated, lower aliphatic or aromatic hydrocarbons, for example, methylene dichloride, ethylene dichloride, chloroform, carbon tetrachloride or monochlorobenzene. The oxidation may take place both in a homogeneous and in a heterogeneous medium. The compound to be oxidized may be present both in a dissolved and in a suspended state. If the compounds to be oxidized are subjected to the reaction, in the suspended state, preferably a polar solvent, for example, water, is used as a medium. As an alternative, the compounds to be oxidized may be dissolved in one of the aforesaid, organic hydrocarbons, to which is added an aqueous solution of one of the solid oxidizing agents.

The oxidation with chromium trioxide may take place both in an alkaline, a neutral or an acidic medium. The alkalinity of the reaction medium may be obtained, for example, by adding to the mixture of the reaction components, an organic, tertiary nitrogen base, for example pyridine, collidine, piperidine, quinoline, diethyl aniline, dimethyl aniline, and so on. If the reaction is carried out in an acidic medium, it takes place preferably in glacial acetic acid or a different, lower aliphatic, liquid carboxylic acid or a mixture thereof, for example, propionic acid, butyric acid, valeric acid, pentane-carboxylic acid, hexane carboxylic acid, heptane carboxylc acid, isobutyric acid and so on. However, the reaction may be carried out also, in the presence of an inorganic acid, preferably sulfuric acid. If the oxidative decomposition is carried out with potassium- or sodium- or ammonium-bichromate, it is desirable that the reaction medium should be acidic. This is ensured, preferably, by adding sulfuric acid or acetic acid. The oxidation with potassium permanganate may also take place in an alkaline, a neutral or an acidic medium; the reaction conditions may be the same as described above for the oxidation with chromium trioxide. Since the oxidation with ozone is performed quantitatively, it is advisable to pass no greater quantity of ozone through the liquid containing the compound to be oxidized than is required for the desired oxidation. For the oxidation with the other aforesaid means use may be made of a small excess quantity of the oxidizing agent.

The concentration of the compound to be oxidized is not subjected to narrow limits. Satisfactory results are obtained, when the starting substance is contained in the reaction medium in a quantity of 0.1 to 20% by weight, preferably 1 to 10% by weight. After the oxidation with the solid, aforesaid oxidizing agents, the substance obtained may be isolated in a conventional manner from the reaction mixture. When using an excess quantity of the oxidizing agent it is advantageous to reduce it first with a sufficient quantity of a lower aliphatic alcohol, for example, methanol or ethanol. Then the reaction mixture is poured out in water, after which the mixture is extracted with an organic solvent, so that the ketone produced is separated out in a substantially pure state. If the oxidation takes place with ozone, it is necessary to decompose the primarily produced oxidation product (an ozonide). This decomposition may take place with reducing or oxidizing agents, further aliphatic aldehydes, for example formaldehyde, para-formaldehyde, acetaldehyde, butanal, propional, or aromatic aldehydes, for example benzaldehyde, and furthermore saccharoidal aldehydes, for example glucose, pentose. Preferably the decomposition of the ozonide is carried out with mild reduction means, if $R_4$ and $R_2$ represent a 3-keto $\Delta^{4,6}$, or a 3-keto $\Delta^{4,7}$ system. In these cases use may be made of the mentioned aldehydes. As a reducing agent may be used, for example, zinc dust with acetic acid or iron powder with sulfuric acid. As an oxidizing agent for the decomposition of the ozonide may be used, for example, hydrogen peroxide or an alkaline solution of potassium permanganate.

If the ring A of the steroid skeleton has a double bond at the position 4 ($\Delta^4$) and if this double bond is not in conjugation with a 3-keto-group, it is advisable to protect this double bond from attack by the aforesaid oxidizing agents. This protection may be obtained by converting the compound, prior to the oxidation, into a 4.5 dibromide, for example, by adding to a solution of the compound the required quantity of a solution of liquid bromine in, for example, chloroform and by splitting off subsequent to the oxidation the bromine atoms for example by reduction with zinc dust in glacial acetic acid. The $\Delta^4$ double bond may in such a case, also be protected by converting the compound into an epoxide for example, by reacting the starting substance with hydrogen peroxide in an alkaline medium and, subsequent to the oxidation of the side chain, by decomposing the epoxide. This decomposition of the epoxide may be carried out with a reducing agent, for example, the aforesaid agents, or by a reaction with a solution of potassium iodide in acetic acid.

Suitable starting compounds for the production of compounds of Formula V are, in general, the compounds of the Formula IV, which are described in the foregoing part of the invention. Particularly, those compounds may be mentioned, in which $Q^V$ is a hydrogen atom and $Q^{IV}$ is a secondary amino radical, of which the N-atom is bound to the carbon atom, to which is also bound $Q^V$, or an —O-acyl radical. The secondary amino radical is preferably the piperidino-group, but also very suitable have proved to be radicals of lower aliphatic, secondary amines with 1 to 6 carbon atoms. As such we may mention: diethyl-, dipropyl-, diisopropyl-, dibutyl- or diisobutyl-amine. Furthermore hydroxylated derivatives of these amines may be used, for example diethanol amine, dipropanol amine. As examples of an O-acyl group reference is to be made in particular to those radicals in which the acyl-group is the radical of an aliphatic carboxylic acid with 1 to 6 carbon atoms. As such we may mention, preferably as an O-acyl-group, the O—CO.CH$_3$ (acetyl)-group and furthermore the propionyl-, butyryl- and valeryl-group.

One of the compounds according to the invention, which is of particular importance, is a substance which will be referred to hereinafter as pyroprogesterone. It should be noted that the prefix "pyro" herein does not mean that the compound is obtained by heating progesterone, but that the structure of the compound and the configuration thereof are comparable with those of pyroergocalciferol. The compound may be characterized by a 3-keto-$\Delta^4$-system in ring A, a saturated B, C and D-ring, an acetyl-group at the position 17, a 10-α-methyl-group and presumably a 9-α-hydrogen atom (Formula XVIII).

The compound may furthermore be characterized by its physiological action. The compound is progestative like progesterone and is less tonical than the latter substance. Very remarkable is it furthermore, that when assessing in accordance with the invention the properties of pyroprogesterone, no androgenic action was found. The androgenic action has been referred to as a disadvantage of other progestative substances. The absence of this activity has been proved for the pyroprogesterone with rats. From experiments carried out on rabbits and rats it has furthermore been stated that the compound according to the invention does not disturb the gravidity of rabbits and rats.

In Example 3 this part of the invention is illustrated by description of the preparation of pyroprogesterone.

The invention furthermore relates to the oxidation of compounds of Formula VI into compounds of the general Formula VII. In these formulae $R_4$ and $R_2$ have the aforesaid meanings, whilst $Q^{VI}$ is a hydrogen atom or a methyl-group and $Q^{VII}$ is an aldehyde-group or addition compounds thereof, or an O-acyl-group or a COOR-group, in which R designates an aliphatic hydrocarbon radical with 1 to 6 carbon atoms. If $Q^{VII}$ has the last-mentioned meaning $Q^{VI}$ is always a hydrogen atom.

The oxidation may be carried out advantageously in a manner as described for the oxidation of compounds of the general Formula IV into compounds of the general Formula V, i.e. as oxidizing agents may be used ozone, chromium trioxide, alkali-salts of chromic acid, for example sodium- or potassium-bichromate and furthermore potassium permanganate. The reaction may furthermore take place in a homogeneous and in a heterogeneous and in an aqueous medium. The compound to be oxidized may be available in a dissolved and in a suspended state.

If a compound to be oxidized is converted in a homogeneous medium, the solvents to be used are, in the first place, aliphatic or aromatic hydrocarbons, for example, petroleum ether, ligroin, petrol or aromatic hydrocarbons such as benzene, toluene or mesithylene. Very suitable have proved to be a number of halogenated lower aliphatic hydrocarbons, for example, methylene dichloride, ethylene dichloride, chloroform, carbon tetrachloride or monochloro-benzene. If the compound to be oxidized is subjected, in a suspended state, to the reaction, preferably a polar solvent such as water is used as a medium. The oxidation with ozone can be readily carried out and is therefore to be preferred over the use of the other, aforesaid oxidizing agents. Preferably a compound of the Formula VI is dissolved in one of the aforesaid aliphatic, aromatic or halogenated aromatic or aliphatic hydrocarbons, after which ozone-containing air or oxygen is led through the solution. It is advisable to keep the temperature low during the reaction. Satisfactory results were obtained within the temperature range of —100° and +30° C. The best results were obtained in a temperature range of —80° to +10° C. The concentration of the compound to be ozonised is not subjected to narrow limits; it lies, for example, between 0.5% by weight and the saturation concentration. By the ozonisation an ozonide is formed, which, subsequent to splitting up with reducing or oxidizing agents, yields a ketone of the Formula VII. As a reducing agent may be used, for instance, zinc dust with glacial acetic acid or iron powder with sulfuric acid. Further aliphatic aldehydes, for example formaldehyde, para-formaldehyde, acetaldehyde, butanal, propional, or aromatic aldehydes, for example benzaldehyde, and furthermore saccharoidal aldehydes, for example glucose, pentose. Preferably the decomposition of the ozonide is carried out with mild reduction means, if $R_4$ and $R_2$ represent a 3-keto $\Delta^{4,6}$ or a 3-keto $\Delta^{4,7}$ system. In these cases use may be made of the mentioned aldehydes.

If the ozonide would be converted by oxidative decomposition into a compound of the Formula VII, use may be made to this end, for example, of hydrogen peroxide or an alkaline solution of potassium permanganate. The oxidation of a compound of the Formula VI with chromium trioxide may take place in an alkaline, a neutral and an acidic medium. An alkaline reaction medium may be obtained, for instance, by adding to the mixture of the reaction components an organic, tertiary nitrogen base, for instance, pyridine, collidine, piperidine, chinoline, dimethyl- or diethyl-aniline, and so on. If the reaction is carried out in an acidic medium, it is preferably done in the presence of a lower aliphatic carboxylic acid, for example, acetic acid, propionic acid, butyric acid, valeric acid, pentane-carboxylic acid, hexane-carboxylic acid, heptane-carboxylic acid, isobutyric acid and so on. Instead of using an aliphatic carboxylic acid, use may be made, however, of an inorganic acid, preferably sulfuric acid.

If the oxidative decomposition of a compound of the Formula VI is carried out with potassium-, sodium- or ammonium-bichromate, it is desirable that the reaction medium should be acidic. This is preferably achieved by adding diluted sulfuric acid to the reaction medium.

The oxidation with potassium permanganate may take place in an alkaline, a neutral and an acidic medium.

The reaction conditions in this case may be the same as those stated above for the oxidation with chromium trioxide. The reaction is particularly suitable for being carried out with those compounds in which $Q^{VI}$ is a methyl-group and $Q^{VII}$ is an aldehyde group or addition products of the latter compound (for instance HCN or bisulfite addition compounds). As starting compounds are particularly suitable those in which $R_4$ is a keto-oxygen atom and $R_2$ is a double bond between the carbon atoms 4 and 5, $Q^{VI}$ is a methyl group and $Q^{VII}$ is a grouping of the Formula IX.

The advantage of the conversion of a configuration X, if any, at the carbon atom 17 of a starting compound into configuration XI, in which $Q_1$ is a group —CN or —$SO_3H$ resides in that the aldehyde function in group 21 in conjunction with a carbon-carbon double bond is fairly resistant to oxidation, which is no longer the case when this structure is broken up by the formation of addition compounds.

It should finally be stated that the compounds obtained in accordance with this part of the invention have interesting pharmacological properties and can be used for the synthesis of novel compounds, particularly of compounds according to Formula VIII.

The compounds of the Formula VI, owing to cistransisomery about the double bond Δ17 (20), may occur in two isomeric forms.

The compounds used as starting substances in accordance with this part of the invention, are novel compounds. It will be stated hereinafter briefly how these compounds can be produced.

As stated above, the starting substances may be arranged in three different groups:

*Group A.*—It comprises the compounds in which $Q^{VI}$ is a $CH_3$-group and $Q^{VII}$ is a group of the formula

(or addition products thereof, for instance with HCN or with bisulfite).

*Group B.*—It comprises substances in which $Q^{VI}$ is a $CH_3$ group and $Q^{VII}$ an —O-acyl-group.

*Group C.*—This group comprises compounds in which $Q^{VI}$ is a hydrogen atom and $Q^{VII}$ is a group —COOR, wherein R is an aliphatic hydrocarbon radical with 1 to 6 carbon atoms.

*Production of compounds of group A*

Compounds associated with this group of substances may be produced by two methods.

According to the first method bromine is caused to act upon aldehydes of the Formula III.

With this reaction the α-hydrogen atom (with respect to the aldehyde group) is replaced by bromine, whilst hydrobromide is formed simultaneously. By withdrawing, from the compounds formed (Formula IIIA) HBr, starting substances of the Formula VI are obtained, which are suitable for conversion in accordance with the invention into compounds of the Formula VII. The bromification may be satisfactorily carried out by dissolving an aldehyde of the Formula III in an aliphatic or aromatic hydrocarbon or a halogenated aliphatic or aromatic hydrocarbon, for example, petroleum ether, ligroin, petrol, benzene, toluene, mesitylene, dichloro-ethane, chloroform, carbon tetrachloride, methylene chloride, to this solution being added a solution of bromine in one of the aforesaid solvents. It is advisable to accelerate catalytically the formation of the bromine-substitution product, which may be carried out by exposing the reaction mixture to, for example, a conventional incandescent lamp. It is furthermore very desirable that the reaction mixture should contain a hydrobromide-acceptor in order to bind the HBr formed in the substitution reaction. To this end use may be made, for example, of suspended calcium carbonate, or calcium hydroxide; if desired also pyridine or a different nitrogen base may be used. Since these compounds, however, are capable of reacting with bromine, whilst forming products having per se also brominating properties, there is a possibility of byproducts being formed.

The temperature of the bromification preferably lies between 0° and 50°, for example between 20° C. and 30° C. The duration of the reaction is about 1 to 3 hours. In order to avoid as far as possible the formation of byproducts, it is furthermore desirable to add the bromine solution slowly and to have the reaction mixture contain not more of bromine than the formation of the bromine substitution product requires. Moreover, it has been found that the exclusion of oxygen from the reaction is advantageous and that it is therefore advisable to carry out the reaction in a nitrogen atmosphere. The formation of byproducts cannot be avoided without taking particular precautions, if the ring A of the steroid skeleton contains a 3-keto-Δ4-configuration, since in this case also substitution at the position 2 of the steroid skeleton may take place.

If this grouping does occur in a suitable starting substance, it is advisable to carry out the reaction by the second method to be described hereinafter, which may otherwise also be employed successfully, if the starting substance does not contain a 3-keto-Δ4-configuration.

According to the second method bromine is added to an enamine of the Formula IV, preferably the piperidinoenamine. In this formula the piperidine ring may, however, be replaced by a different secondary amine.

The bromine addition to these enamines preferably takes place at a lower temperature, preferably at a temperature between —80 and 20° C., for example at —55 to 0° C.

It is furthermore advisable to use equimolar quantities of bromine (i.e. the quantity required for the addition of 2 bromine atoms) for the reaction. The time required for this reaction is very short and is, as a rule, less than 15 minutes. Then the dibromo-enamine (Formula IVA), if desired subsequent to isolation, is dissolved in an organic solvent, for example, an aliphatic or aromatic hydrocarbon or a halogenated aliphatic or aromatic hydrocarbon, to which solution is added water, so that the dibromoenamine hydrolyses. The duration of this hydrolysis is fairly long, i.e. about 5 hours. The reaction is preferably carried out whilst thoroughly stirring and at a temperature between 0 and +50° C., preferably between +10 and +30°. With this hydrolysis an α-bromine compound of the aforesaid formula IIIA is produced, after separating off HBr, which is preferably carried out in the presence of a basically reacting inorganic or organic compound, for example as an inorganic compound a metal oxide or a metal hydroxide, for example, calcium oxide, calcium hydroxide, barium oxide, barium hydroxide or magnesia, or as an organic base a primary, secondary or a tertiary nitrogen base, for example as a primary amine, ethyl amine, propyl amine, butyl amine, benzyl amine, aniline or as a secondary amine, for example dimethyl amine, diethyl amine, dipropyl amine, diisopropyl amine, dibutyl amine, methyl aniline and ethyl aniline, piperidine and as a tertiary base for example trimethyl amine, triethyl amine, tripropyl amine, triisopropyl amine, tributyl amine, trimethyl aniline, diethyl aniline, collidine quinoline, isoquinoline, picoline, lutidine and pyridine. It should be noted that the separation of hydrobromic acid with a primary or a secondary amine is not preferred, if a 3-keto-group is present in ring A of the steroid skeleton. In this case a tertiary nitrogen base or an inorganic base as a HBr-acceptor is preferred.

The aldehyde of the Formula VI, wherein $Q^{VI}$ is a methyl group and $Q^{VII}$ a

group, obtained by either of the two methods referred to under A, is preferably then converted, prior to the oxidation into a compound of the Formula VII, into a HCN— or a bisulfite-addition compound. The production of the HCN addition compound is preferred, particularly since this production is fairly simple. The *HCN addition compound* may be obtained, for example, by dissolving or suspending the corresponding aldehyde in a diluent, for example, one of the aforesaid aliphatic or aromatic hydrocarbons and by adding to this medium a solution of sodium- or potassium cyanide in a lower aliphatic alcohol, for example methanol. Then this reaction mixture has added to it dripwise, at a lower temperature (for example —20° C.) for one hour glacial acetic acid. HCN is thus slowly formed, which adds to the carbonyl group and forms the desired addition product. The reaction is completed by leaving the reaction mixture at rest for a long time (about 24 to 48 hours at —5° C.). The *bisulfite addition compound* may be produced by reacting the aldehyde with sodium bisulfite, for example, in an aqueous, methanolic solution. The formation of an addition compound is especially desired when $R_2$ is a double bond between the carbon atoms 4 and 5.

*Production of compounds of group B*

In the compounds of this group $Q^{VI}$ is a $CH_3$— and $Q^{VII}$ a —O-acyl group. Acyl is for example the acyl radical of an aliphatic carboxylic acid with 1 to 6 carbon atoms or of an aromatic carboxylic acid, for example, of acetic acid, propionic acid, butyric acid, valeric acid or of benzenecarboxylic acid. However, the acyl group is preferably the acid radical of acetic acid. For the production of this group of substances we can start by the compounds of the general Formula V. By acetylating compounds of this formula with isopropenyl acetate (Formula XII) in the presence of catalytic quantities of concentrated sulfuric acid enol acetates are produced. It is not necessary to add to the reaction mixture a diluent, for example a solvent, as such the isopropenyl acetate itself may serve. The reaction is preferably carried out at the boiling point of the reaction mixture, for 1 to 15 hours. During the reaction the acetyl group is separated from the isopropenyl acetate group, whilst acetone is formed, which is withdrawn slowly from the reaction mixture by distillation. The enol acetate formed by this reaction probably has the structure according to Formula VA. This compound may be converted without intermediate isolation, into a compound of the Formula VI, in which $Q^{VI}$ is a methyl-group and $Q^{VII}$ an —O-acyl, by adding a catalyst to the reaction mixture, which catalyst is to be capable of shifting the double bond to the nucleus. As such a small quantity of para-toluene sulfonic acid, dissolved in acetic acid anhydride, is found to be very suitable.

If a 3-keto-$\Delta^4$ grouping is present in a compound of the Formula V in ring A of the steroid skeleton, this configuration is converted with the aforesaid reaction wholly or partly into a $\Delta^{3,5}$-3-enol acetate configuration. The 3-keto-$\Delta^4$-grouping may be re-obtained by iodizing the reaction product with iodosuccinimide, dissolved in dioxane, followed by deiodizing with sodium bisulfite. With this reaction the grouping at the $C_{17}$ side chain is substantially not or not at all disturbed.

*Production of compounds of group C*

Compounds associated with this group may be obtained by condensing a compound of the Formula V with oxalic acid-dialkyl esters, for example the diethyl ester, in the presence of a condensing agent, for example sodium methylate. With this reaction, which is preferably carried out in the presence of a solvent, for example, a lower aliphatic alcohol, more particularly tertiary butyl alcohol, a compound is produced, which can be represented by the Formula VB. If to the reaction mixture is added a solution of sodium acetate in glacial acetic acid and methanol, and subsequently a solution of bromine, for example, in chloroform, a dibromo-reaction product is obtained, which, after decomposition with an alkali-alkanolate, for example, sodium methylate or sodium ethylate, yields the desired compound of the Formula VI, in which $Q^{VI}$ is a hydrogen atom and $Q^{VII}$ is a COOR-group. This reaction, which is capable of giving a high yield in spite of its fairly complicated accomplishment, is preferably carried out with an excess quantity of the oxalic acid dialkyl ester. If in the ring A of the steroid skeleton of the starting compound of the Formula V there is a 3-keto-group, the excess quantity of the dialkyl oxalic acid ester may associate with one of the carbon atoms of ring A, for example at the position 2 or 4 (the formation of such byproducts does not occur, however, if substituents are already present at these positions). If no hindrance occurs with 3-keto-compound of the Formula V, the reaction with the excess quantity of oxalic acid dialkyl ester, after accomplishment (bromination, followed by decomposition with sodium methanolate) results in a 3-keto 2 or 4-bromo-substitution product. This bromine atom may be separated off, for example by reduction with zinc dust in glacial acetic acid, but, if desired, this bromine atom may be maintained or be replaced by a different group, for example, a methyl group or be separated off to obtain a double bond between the carbons atoms 1 and 2 or 4 and 5. In the Examples 4 and 5 this part of the invention is illustrated. The preparation of compounds of the Formulae XX, XXI, XXII and XXIII is described in these examples.

The invention furthermore relates to the production of compounds of the general Formula VIII from compounds of the general Formula VII. In these formulae $R_4$ is a hydroxy- or an esterified or etherified hydroxy-group or a keto-group, $R_2$ is a saturated or double bond between the carbon atoms 4 and 5, $R_9$ is a hydrogen atom or a saturated or unsaturated hydrocarbon radical with 1 to 6 carbon atoms or such a hydrocarbon radical of which one or more of the hydrogen atoms is replaced by one or more hydroxy- or esterified hydroxy-groups and/or double-bonded oxygen atoms, and $R_{10}$ is a hydroxy-group which may be esterified with an aliphatic carboxylic acid with 1 to 8 carbon atoms, preferably 6 carbon atoms.

The compounds of Formula VIII comprise two important sub-groups, i.e.

(1) One in which $R_9$ is a hydrogen atom and $R_{10}$ is a hydroxy- or a hydroxy-group, which may be esterified for example with an aliphatic carboxylic acid with 1 to 8 carbon atoms, (2) A second group in which $R_9$ is a saturated or an unsaturated aliphatic hydrocarbon radical with 1 to 6 carbon atoms and $R_{10}$ has the aforesaid meaning.

The compounds according to the first sub-group are produced by reducing compounds of the general Formula VII with a reducing agent which is suitable for converting ketones into secondary alcohols, for example with a complex metal hydride having two different metal atoms, for example, lithium-aluminium hydride, sodium-boron hydride, furthermore aluminium-alkyl compounds, for example, diethyl-aluminium hydride, diisobutyl-aluminium hydride or triethyl-aluminium. The reduction may also take place by catalytic hydrogenation, for example, with hydrogen gas and palladium, platinum or Raney nickel as a catalyst. The reducing may, as an alternative, be carried out by the Meerwein-Ponndorf method with aluminium-isopropylate. A further suitable reducing method is that carried out with an alkali metal and a lower aliphatic mono- or di-alcohol, for example sodium and ethanol, isopropanol, isobutanol or glycol. Finally a reducing agent may be an alkali metal and liquid ammonia, for example lithium and ammonia. These reductions are known per se from the literature and need not be explained in detail.

If, prior to the reduction, the starting substance of the Formula VII contained in ring A a 3-keto-group, it is substantially unavoidable that during the reduction of the 17-keto-group also the 3-keto-group is reduced. For the production of final products with a 3-keto-group it is therefore desirable that after the reduction a selective oxidation should take place to convert a 3-hydroxy- into a 3-keto-group. This oxidation may be carried out in the presence of a $\Delta^4$-double bond with manganese dioxide in an anyhdrous medium at room temperature. As a solvent for the compound to be oxidized use may be made of, for example an aliphatic or an aromatic hydrocarbon or a halogenated aliphatic or aromatic hydrocarbon.

For the production of those compounds in which at the position 3 a hydroxy-group, between the carbon atoms 4 and 5 a double bond and at the position 17 a hydroxy group is found, the starting substance may be a 3,17-diketo-$\Delta^4$-compound, which is reduced in the aforesaid manner.

If it is desired to esterify either the 17-hydroxy or the 3-hydroxy-group or both, this may take place by reacting the sterol concerned with an acidic halide, for example the acid chloride of an aliphatic carboxylic acid with 1 to 8 carbon atoms or an aromatic carboxylic acid in the presence of pyridine in order to bind the hydrochloric acid set free. As an acid chloride use may be made, for example, of acetic acid chloride or benzoyl chloride, but it is more inviting to use an aliphatic acid chloride with 5 to 8 preferably 6 carbon atoms, since the 17-esters thus obtained in corresponding other compounds have a more favourable pharmacological action, particularly a more prolonged action than the esters having a smaller number of carbon atoms. The reaction may, if desired, be carried out with an acid anhydride instead of an acid chloride. As an acid anhydride use may be made, particularly, of the anhydrides of the di-alkaline carboxylic acid, for example succinic acid anhydride. However, also the anhydrides of the said aliphatic carboxylic acids with 1 to 8 carbon atoms may be used.

The compounds of the second sub-group are produced by reacting compounds of the general Formula VII with a saturated or an unsaturated metal-aliphatic compound. This reaction is particularly important for the production of those compounds in which $R_9$ is a saturated or an unsaturated aliphatic radical with 1 to 6 carbon atoms, preferably 1, 2 or 3 carbon atoms.

For this reaction, in principle, two methods may be used. With the first method a compound of the Formula VII reacts with an aliphatic Grignard compound with 1 to 6 carbon atoms, the MgHlg-group being bound to a carbon atom which does not carry a double bond. In the second method a compound of the Formula VII reacts with a triple, unsaturated metal-aliphatic compound, in which the metal atom is bound to one of the two triple-unsaturated carbon atoms. It should be noted that the second method may also be employed for the production of compounds which are obtained otherwise only in the first method, i.e. by hydrogenating the unsaturated compounds obtained.

When using the Grignard reaction the conventional technique can be applied, i.e. for example an ethereal solution of a compound of the Formula VII is caused to react with methyl-magnesium bromide, ethyl-magnesium bromide, propyl-magnesium bromide, butyl-magnesium bromide or isobutyl-magnesium bromide. If desired, corresponding chlorine- or iodine-compounds may be used.

The Grignard method is very suitable for the production of 10($\alpha$) methyl-17($\beta$)OH17($\alpha$) methyl steroids or compounds which have, at the position 17, not only an OH-group but also a group —$CH_2$—$C\equiv CH$ or

—$CH_2$—$CH=CH_2$

When using the second method use is preferably made of a lithium-, sodium- or potassium-compound, for example, the ethynilide or the corresponding propargyl-compound. The reaction may be carried out by dissolving an alkali metal in liquid ammonia, by passing through this solution a triple-unsaturated aliphatic hydrocarbon and by adding to this solution, which may contain an aliphatic ether, for example, diethyl ether, tetrahydrofurane or petroleum ether as a diluent, a solution of a compound of the Formula VII. After hydrolysis of the intermediate metal compound a compound of the Formula VIII is formed, which may be subjected, if desired, to a complete or partial hydrogenating of the group $R_9$.

According to this second method compounds may be produced which have, at the position 17, not only a 17($\beta$)OH— group but also a group —$C\equiv CH$—, —$CH=CH_2$, —$CH_2$—$CH_3$, —$C\equiv C$—$CH_3$,

—$CH=CH$—$CH_3$, —$CH_2$—$CH_2$—$CH_3$

Compounds are preferably produced which have, at the position 3, a keto-group or a hydroxy-group and a single or a double bond between the carbon atoms 4 and 5.

With the two methods it should be taken into account that also reactions at the carbon atom 3 may take place, if a keto-group is bound thereto.

This keto-group can be "protected" by conversion into an ether, an enamine, or a glycolacetal. For this purpose methods are described in American patent specification 2,774,777; German patent specification 954,695 and Swiss patent specification 235,484. If not only a 3-keto-group but also an unsaturated, double bond between the groups 4 and 5 is present, it is advisable, when ethynilating at carbon atom 17, to use the German patent application, laid out for public inspection, No. 1,016,707.

When using the Grignard method protection of the 3-keto-group, of any, is not necessary, if the reaction is carried out with equimolar quantities of the Grignard compound.

It should be noted that with the production by the two methods the saturated or the unsaturated aliphatic radical is in the $\alpha$-position and the 17-hydroxy-group in $\beta$-configuration. The compounds of the Formula VIII may, in turn, serve as starting substances for the production of other compounds of the Formula I. To this end known methods may be employed. This part of the invention is illustrated in the Examples 6 and 7, in which examples the compounds of the Formulae XXIV and XXV are prepared.

The active compounds according to the invention may be worked up to pharmaceutical preparations. If the compounds are orally active, they may be incorporated in tablets. Tablets are made, for example, which contain 1 to 10 mgs. of active compound per tablet of 200 mgs. The active substances may furthermore be dissolved, in known manner, in aqueous media or suspended for the preparation of injection liquids. This is illustrated in Example 8.

EXAMPLE 1A

A solution of 5 gs. of pyrocalciferol in 100 mls. of dry, distilled toluene and 15 mls. of dry, distilled cyclohexanone was heated to boiling and 20 mls. of solvent was distilled off to remove the prevailing traces of moisture. Then, whilst boiling, a solution of 1.4 gs. of Al. isopropylate in 10 mls. of toluene was added, the mixture being refluxed for 20 minutes. During the whole reaction a slow current of nitrogen was conducted over the substance.

After cooling of the reaction mixture to 50° C., it was poured out into 65 mls. of 2 N hydrochloric acid of 5° C., the layers were separated and the hydrochloric acid layer was extracted once with diethyl ether. Then the collected extracts were washed in succession with ice water, 1% cold $NaHCO_3$ solution and ice water. In vacuo the diethyl ether was evaporated and the volatile constituents of the residue were removed by steam distillation.

When the contents of the flask were left overnight at a lower temperature, the organic substance became quite solid and the water layer could be decanted. The last quantity of water was removed in vacuo (10 mms.) at 50° C. at the most and the residue was finally crystallized from 30 mls. of boiling acetone at −5° C.

Thus 2.75 gs. of practically pure Δ4.7.22-pyrostatriene-3-one (Formula XII) was obtained, with a melting point of 140.5 to 141.5° C. A small portion was recrystallized, for analysation purposes, from acetone to have a constant melting point.

Melting point 141 to 141.5° C.

$[\alpha]_D^{21.5} = +410$ (ethanol)
$\epsilon$ ($\lambda$ max. 240 m$\mu$) = 14,600 (methanol)
Calculated $C_{28}H_{42}O$: C, 85.22%; H, 10.73%.
Found:
    C, 85.22%; H, 10.71%
    C, 84.94%; H, 11.00%

The infrared spectrum had bands at 874, 969, 1463, 1631 and 1670 cm.$^{-1}$.

EXAMPLE 1B

Whilst thoroughly stirring, at about 10° C, 2.5 gs. of Δ4.7.22-pyrostatriene-3-one was dissolved in 50 mls. of isopropanol, which had previously been saturated at the said temperature with dry hydrochloric acid gas. During this addition the temperature increased for a moment to 18° C., but within a few minutes it had dropped again to about 10° C. After 15 minutes of stirring, the substance was poured out into a mixture obtained by stirring 125 gs. of $NaHCO_3$ with 250 mls. of distilled water, with which it was stirred further for 15 minutes.

The organic layer was dissolved in two extractions in petroleum ether and the extracts were washed with water (twice), bicarbonate and water. After drying on $Na_2SO_4$ and filtering, the solution was evaporated to dryness in vacuo and the residue was crystallized from 2.5 mls. of ethanol (at −5° C.); thus Δ4.6.22-pyrostatriene-3-one was obtained (Formula XIV). 1.9 gs. was obtained, with a melting point of 87 to 89° C.

A small portion was recrystallized to a constant melting from ethanol.

Melting point 90 to 90.5° C. $[\alpha]_D^{20} = +74°$ ($CHCl_3$).

Calculated for $C_{28}H_{42}O$: C, 85.22%; H, 10.73%.
Found:
    C, 84.89%; H, 10.95%
    C, 85.12%; H, 10.95%
$\epsilon$ ($\lambda$ max. 290 m$\mu$) = 25,500

The infrared spectrum of the substance had bands at 872, 968, 1580, 1613 and 1661 cm.$^{-1}$.

EXAMPLE 1C

A solution of 4.6 gs. of Δ4.6.22-pyrostatriene-3-one, melting point 89 to 90.5° C., in 460 mls. of dry diethyl ether, was added to 690 mls. of dry, liquid ammonia. Whilst stirring thoroughly, there was added dripwise, at the boiling point of the mixture, a solution of 630 mgs. of lithium in 100 mls. of liquid ammonia, until no spontaneous decolouring occurred any longer. The reaction mixture was then decomposed by adding slowly 135 mls. of anhydrous ethanol and by stirring subsequently for 30 minutes. After dilution with water the top layer was separated off and the water layer was extracted with diethyl ether. The collected layers were washed with water to neutral reaction, dried on $Na_2SO_4$, filtered and the solvent was distilled off.

($E_{1cm}^{1\%}$ ($\lambda$ max. 241 m$\mu$) = 114)

From this residue the pure compound of the Formula XIV A can be obtained by quickly processing this residue and in a neutral medium. This compound can be isomerized into a compound of Formula XV in an alkaline or acidic medium.

The impure residue obtained was dissolved in 150 mls. of boiling ethanol and 9 mls. of 2 N-NaOH solution in water was added, after which boiling was continued for 5 minutes. Then the mixture was rapidly cooled and poured out into cold water, dissolved in diethyl ether (twice) and the ether extracts were washed thoroughly with water. The residue obtained after drying on $Na_2SO_4$, filtering and evaporating to dryness, was dissolved in 40 mls. of dry thiophene-free benzene, chromatographed over 45 gs. of alumina (according to Brockmann II) and eluted with 150 mls. of benzene. The eluate, evaporated to dryness, was then crystallized from 20 mls. of ethanol at −5° C.; then 3.0 gs. of crystalline Δ4.22-pyrostadiene-3-one (Formula XV) was obtained; melting point 136 to 138° C.

A small portion was recrystallized a few times from ethanol, to obtain a constant melting point, for analyzation.

Melting point 139 to 140° C. $[\alpha]_D^{20} = -20°$ ($CHCl_3$).
Calculated for $C_{28}H_{44}O$: C, 84.79%; H, 11.17%.
Found:
    C, 84.90%; H, 11.10%
    C, 85.11%; H, 11.28%
$\epsilon$ ($\lambda$ max. 242 m$\mu$) = 15,300

The infrared spectrum exhibited bands at 864, 870, 965, 1614 and 1668 cm.$^{-1}$.

EXAMPLE 1D

A solution of 3.5 gs. of Δ4.22-pyrostadiene-3-one in 250 mls. of dry, distilled methylene chloride and 1.5 mls. of anhydrous pyridine was cooled to −80° C. (carbon dioxide, ice, acetone) and whilst stirring for 47.5 minutes, an ozone-air mixture was passed through the solution (0.88 mmol ozone/minute). The solution was then diluted with 19 mls. of acetic acid and the ozonide was decomposed by stirring it for one hour at 0° C. and for 5 minutes at 35° C. with 5.25 gs. of zinc dust. After filtering, the solution was poured out into water, the water layer was extracted, after separation, with methylene chloride and the collected extracts were washed in succession with water (twice), a cold $Na_2CO_3$ solution (14 and 10 mls. respectively), a cold 2 N NaOH solution and then with cold water to neutral reaction.

The solution, dried on $Na_2SO_4$ and filtered, was evaporated to dryness and the residue was crystallized from 9 mls. of diethyl ether at −5° C.; 1.3 gs. of 3-keto-pyro bisnorchol-4-ene-22-al (Formula XVI) with melting point of 103 to 105° C. was obtained. Repeated recrystallizations from diethyl ether raised the melting point to 111 to 113° C. The turbid melt became clear at about 125° C.

The ultraviolet spectrum had an absorption maximum at 242 m$\mu$ ($\epsilon$ = 16,200 $[\alpha]_D^{26} = -70°$ ($CHCl_3$).

Found:
C, 79.98%; H, 9.74%
C, 80.28%; H, 9.86%
Calculated for $C_{22}H_{32}O_2$: C, 80.49%; H, 9.76%.

EXAMPLE 2A

A solution of 800 mgs. of the aldehyde (Formula XVI), obtained by ozonisation of Δ4.22-pyrostadiene-3-one, was refluxed in 20 mls. of dry benzene, after the addition of 0.3 ml. of dry, freshly distilled piperidine and 10 mgs. of p-toluene-sulfonic acid, for 3 hours in a nitrogen atmosphere. The reflowing benzene was filtered, in order to remove the water formed, through pulverized BaO in an extraction vessel.

After cooling the mixture was poured out in water and the organic layer was dissolved in diethyl ether. The extracts obtained were then thoroughly washed with water (four times) and after drying on $Na_2SO_4$ and filtering, evaporated to dryness.

The light-yellow distillation residue had, in the ultraviolet absorption spectrum, a maximum at 242 mμ (ε=18.450), whilst the nitrogen content was 3.45%. The impure 22-piperidino-enamine thus obtained is suitable, without further processing, for the production of the pyroprogesterone according to Example 8.

A portion of the substance was recrystallized, for analysing purposes, to obtain a constant melting point, from acetone, cubes being obtained, which had a melting point of 126 to 128° C.

Found: C, 82.01%; H, 10.73%; N, 3.49%, 3.44%
Calculated for $C_{27}H_{41}ON$: C, 81.97%; H, 10.45%; N, 3.54%
ε (λ max. 241.5 mμ)=21,100.

The infrared spectrum had a strong band at 1670 cm.$^{-1}$ and fairly strong bands at 1614 cm.$^{-1}$ and 855 cm.$^{-1}$.

EXAMPLE 2B

The impure 22 piperidino-3 keto-pyrobisnorcholene-4 obtained according to Example 2a was recrystallized from 45 ml. acetone. 1.9 g. of this substance did not dissolve. This was separated and recrystallized from 70 ml. methylethylketone. After two crystallizations the pure dienamine of Formula XIX was obtained, which had a melting point of 194–195° C.

The ultraviolet absorption spectrum had a maximum at 265 mμ with $E^{1\%}_{1cm.}$=360 and 367; ε =16.600 and 16.800

Calculated for $C_{32}H_{50}N_2$ (462.73); C=83.12%; H=10.82%; N=6.06%
Found: C=83.19%; H=10.77%; N=5.87%

The infrared absorption spectrum had bands at 1717, 1640 and 1609 cm.$^{-1}$.

EXAMPLE 3

A solution of 920 mgs. of enamine (piperidino) of the Formula XVII, in 13.5 mls. of dry, thiophene-free benzene, was added dripwise, whilst thoroughly stirring, at 0° C., within 45 minutes, to a solution of 1.36 gs. of sodium bichromate (2 aq.) in 13.5 mls. of acetic acid and 9 mls. of benzene. After stirring for two hours at the same temperature, 2.25 mls. of methanol was added to decompose the excess quantity of bichromate, after which stirring was continued for 30 minutes.

After pouring out in water, the benzene extract was washed in succession with water, 10% NaOH solution (9 mls.) water, 10% HCl solution (9 mls.) and finally with water to neutral reaction.

The residue obtained subsequent to drying on $Na_2SO_4$, filtering and evaporating to dryness in vacuo, had a weight of 650 mgs. The ultraviolet absorption spectrum of the crude substance had an ε (λ max. 242 mμ) value of 13,300.

Crystallisation of the crude substance from n-hexane yielded thin, fibrous needles of pyroprogesterone (Formula XVIII) having a melting point of 118 to 119° C.

Found:
C, 79.90%; H, 9.45%
C, 80.12%; H, 9.47%
Calculated for $C_{21}H_{30}O_2$: C, 80.20%; H, 9.62%
ε (λ max. 242.5 mμ)=16,000.

The infrared spectrum exhibited characteristic bands at 1705, 1663, 1612 and 857 cm.$^{-1}$.

EXAMPLE 4

7.44 gs. of enamine of the Formula XXVII was dissolved in 368 mls. of methylenechloride. At −55° C., within about 15 minutes, a solution of 3.7 mgs. of bromine in 39 mls. of methylenechloride was added dropwise. Then the reaction mixture was heated to 0° C., 46.5 mls. of water was added and the mixture was stirred at 20° C. for two hours. The methylenechloride solution was separated out, washed twice with water and dried on $Na_2SO_4$. To the dry solution of the bromic aldehyde of the Formula XX was added 15.5 mls. of pyridine. The methylenechloride was distilled off in vacuo and to the residue was added 38.5 mls. of pyridine, after which the dehydrobromification was completed by heating, in order of succession, at 70° C. for one hour and at 100° C. for half an hour. After distilling off the pyridine and dissolving in 110 mls. of methylenechloride and 110 mls. of petroleumether, the mixture was washed with 30 mls. of 2 N hydrochloric acid, twice with water, once with a bicarbonate solution and three times with water. After drying on $Na_2SO_4$ and filtering the solvent was distilled off, the product becoming thus crystalline. The yield was 5.32 gs. of $Δ^{17(20)}$-unsaturated aldehyde of the Formula XXI with a melting point region of 154 to 175° C. $λ_{max}$ 247.5 mμ.

$E^{1\%}_{1cm.}$=900

After repeated recrystallisation with acetone the substance was obtained in the pure state with a melting point of 195–196° C. (in vacuo). $λ_{max}$ (in methanol)=248 mμ. ε=29,800 and 30,000.

Calculated: C, 80.93%; H, 9.26%
Found:
C, 80.78%; H, 9.24%
C, 81.08%; H, 9.11%

The infrared spectrum had strong bands at 1659 and 1608 cm.$^{-1}$.

Although the melting of the crude substance differs much from that of the analysed preparation, the crude substance yet has a very high quality in accordance with the ultraviolet absorption spectrum. The crude substance is likely to comprise a cis- and a trans-isomer.

EXAMPLE 5

Of the aldehyde of the Formula XXI 3.6 gs. was pulverized and suspended at 20° C. in a vigourously stirred solution of 5.77 gs. of sodium cyanide in 36 mls. of absolute methanol. Then 5.1 mls. of acetic acid was added dropwise to this reaction mixture at −20° C. within about 45 minutes, the temperature rising within two hours to +5° C. The reaction mixture was then kept for 45 hours at +5° C., poured out into 110 mls. of methylenechloride and repeatedly washed with ice water. After drying on $Na_2SO_4$ the volume was completed with methylenechloride to 130 mls. and to the solution which contained the cyanic hydrine of the Formula XXII, was added 1.08 mls. of dry pyridine. The solution thus obtained was cooled to −80° C., after which 11.67 mmol ozone was passed through (within 26 minutes). The reaction mixture was decomposed by adding, whilst stirring 3.6 gs. of zinc dust and 10.8 mls. of acetic acid. The temperature rose within about one and a half hours slowly to about 20° C. The solution was filtered, diluted with 130 mls. of petroleumether and washed, in succession with water, 10% NaOH-solution, water, 10% hydrochloric acid solution and water. After drying on $Na_2SO_4$ and filtering the solvent was distilled off, the yield being 2.66 gs. of crystalline residue. Melting point region 150 to 188° C.

$$\lambda_{max}\ 242\ m\mu.\ E^{1\%}_{1cm.}=596$$

After a few recrystallizations with ethanol pure pyro-androst-4-ene-3.17-dione of the Formula XXIII was obtained. Melting point 203–204° C. $\lambda_{max}$ 242 m$\mu$.

$$E^{1\%}_{1cm.}=555\ and\ 563.\ \epsilon=15,000\ and\ 16,100$$

Calculated: C, 79.68%; H, 9.15%
Found: C, 79.95%; H, 9.13%

The infrared spectrum had a strong band at 1664 cm.$^{-1}$, a strong band at 1728 cm.$^{-1}$ and a strong band at 1609 cm.$^{-1}$.

EXAMPLE 6

3.95 gs. of diketone of the Formula XXIII was dissolved in 69 mls. of dry tetrahydrofurane. This solution was added dropwise within about 15 minutes to an adequately stirred, ice-cooled solution of 1.925 gs. of LiAlH$_4$ in 196 mls. of dry tetrahydrofurane. The reaction mixture was then boiled for one hour, after which the excess quantity of LiAlH$_4$ was decomposed with ethylacetate whilst cooling. Then a concentrated Na$_2$SO$_4$ solution (10 mls.) was added and after separating the two layers, the solution of the organic substance was filtered through Na$_2$SO$_4$ and then evaporated. The yield was 4.63 gs. of resinous product of a compound of the Formula XXIV. The U.V. spectrum had no absorption within the measured region.

EXAMPLE 7

The resin of the Formula XXIV obtained as described in Example 6 (4.63 gs.) was dissolved in 210 mls. of chloroform, after which 21 gs. of manganese dioxide was added. The reaction was shaken for 17 hours. It was then filtered and evaporated; the extinction of the crude product was determined. Since only 35% of the expected extinction value was found, the dehydrogenation was continued for 22 hours with fresh manganese dioxide. After re-processing the conversion was found to be about 79%. After a repeated similar treatment for 17 hours, the conversion reached 87%.

The product thus obtained (4.35 gs.) was recrystallized with 20 mls. of acetone. Yield: 2.32 gs. of crystalline substance with a melting-point region of 141–151° C. After repeated recrystallisations with ethylacetate the final yield was 1.1 gs. of pyro-testosterone of the Formula XXV with a melting point of 153–155° C. The U.V. absorption spectrum had a maximum at 243 m$\mu$.

$$E^{1\%}_{1cm.}=524\ and\ 535.\ \epsilon=14,800\ and\ 15,100$$

Calculated for C$_{19}$H$_{28}$O$_2$ (288.19): C, 79.12%; H, 9.78%
Found: C, 79.73%; H, 9.94%

The infrared spectrum had bands at 1410 cm.$^{-1}$ (weak), 870 cm.$^{-1}$ (weak), and 1655 cm.$^{-1}$ (strong), 1604 cm.$^{-1}$ (strong), 3312 cm.$^{-1}$ (strong) and 1054 cm.$^{-1}$ (strong).

EXAMPLE 8

The compounds according to the invention may be processed in known manner to obtain pharmaceutic preparations, for example, tablets, dragees, injection liquids and the like, by mixing the substances with or dissolving or dispergating them in solid and liquid diluents respectively.

Suitable tablets may be obtained, for example, of pyroprogesterone by producing a mixture of the following composition:

| | Mgs. |
|---|---|
| Pyroprogesterone | 1 |
| Gelatine | 2.5 |
| Lactose | 220 |
| Talcum | 24.5 |
| Magnesiumstearate | 2.0 |

What is claimed is:
A compound of the formula

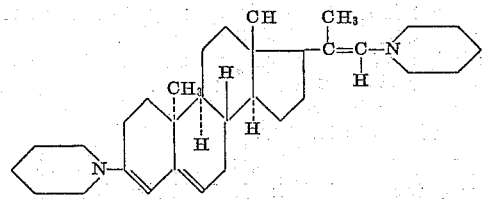

with a melting point of 194–195° C., $\epsilon$ ($\lambda$ max. 265 m$\mu$) 16.600 and in the infrared part of the absorption spectrum bands at 1717, 1640 and 1609 cm.$^{-1}$.

References Cited by the Examiner

UNITED STATES PATENTS 2,752,337  6/56  Herr _____ 260—239.5

FOREIGN PATENTS 882,399  7/53  Germany.

OTHER REFERENCES

Fieser et al.: "Natural Products Related to Phenanthrene" (1949), Reinhold Publishing Corp., pages 325, 375, 385, 498.

"Journal of Chemical Society" (1959), article by Castells et al., pages 1159–1168.

LEWIS GOTTS, *Primary Examiner.*

LESLIE H. GASTON, MORRIS LIEBMAN, *Examiners.*